United States Patent [19]
Loeffler et al.

[11] Patent Number: 6,134,998
[45] Date of Patent: Oct. 24, 2000

[54] PART POSITIONER AND HOLDER FOR LATHES

[76] Inventors: Fredrick L. Loeffler, 2740 S. Canyon Ter., Hinckley, Ohio 44233; Jeffrey F. Loeffler, 13723 Rybak Ave., Garfield Heights, Ohio 44125

[21] Appl. No.: 09/286,318

[22] Filed: Apr. 5, 1999

[51] Int. Cl.[7] .................................................. B23B 13/08
[52] U.S. Cl. ............................... 82/162; 82/163; 82/148; 82/120
[58] Field of Search .............................. 82/162, 163, 120, 82/121, 71, 101, 148; 408/67, 76

[56] References Cited

U.S. PATENT DOCUMENTS

| | | |
|---|---|---|
| 2,672,770 | 3/1954 | Buck .......................................... 408/76 |
| 3,762,829 | 10/1973 | Yilmaz . |
| 4,100,826 | 7/1978 | Takahashi . |
| 5,275,514 | 1/1994 | Johnson ...................................... 408/76 |
| 5,618,396 | 4/1997 | Hiermaier et al. . |

FOREIGN PATENT DOCUMENTS

| | | | |
|---|---|---|---|
| 0142114 | 6/1991 | Japan ....................................... 408/76 |
| 0142115 | 6/1991 | Japan ....................................... 408/76 |

*Primary Examiner*—Henry W. H. Tsa
*Attorney, Agent, or Firm*—Vickers, Daniels & Young

[57] ABSTRACT

An electromagnetic workpiece positioning and holding device is mountable on a metal working lathe for pulling bar stock to a working position relative to metal working tools and/or for holding and stabilizing an outermost end portion of a workpiece during a cut-off operation. The coil of the electromagnet is in an electrical circuit with a 24 volt power supply and a control switch by which the coil is connected to and disconnected from the power supply.

16 Claims, 2 Drawing Sheets

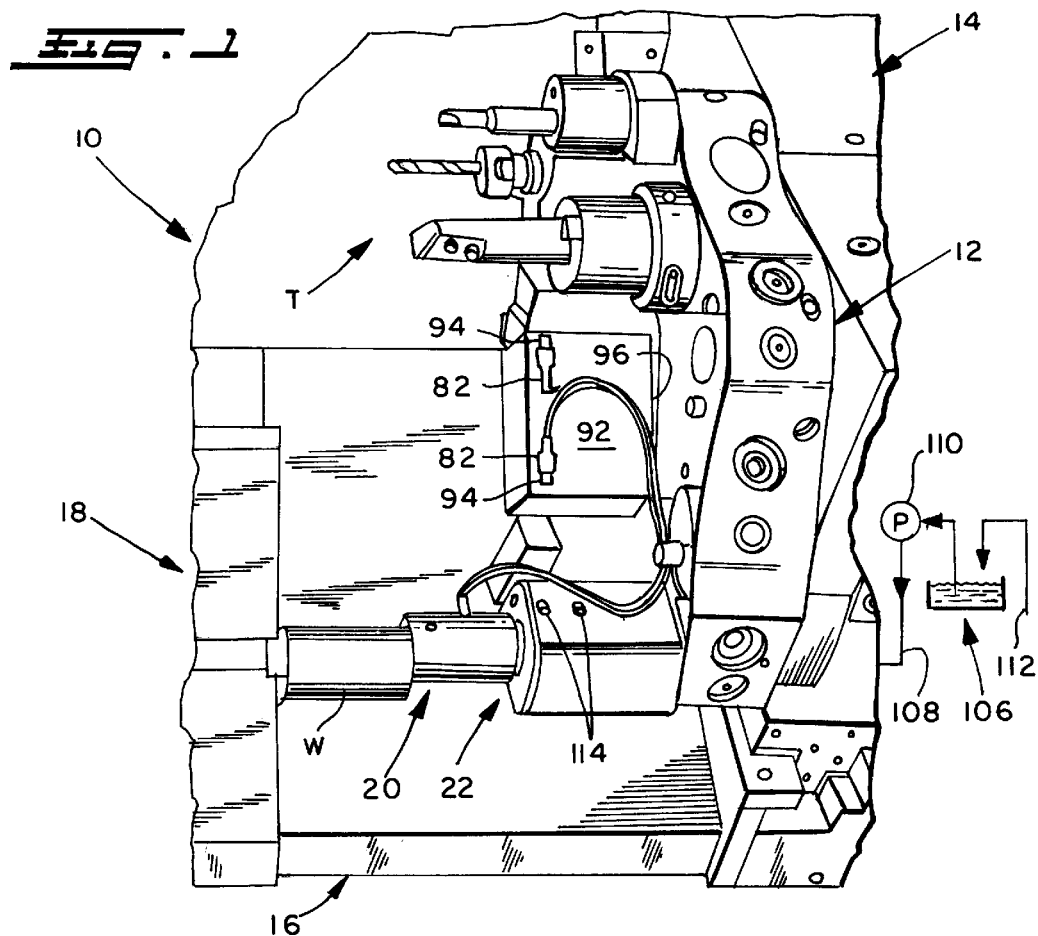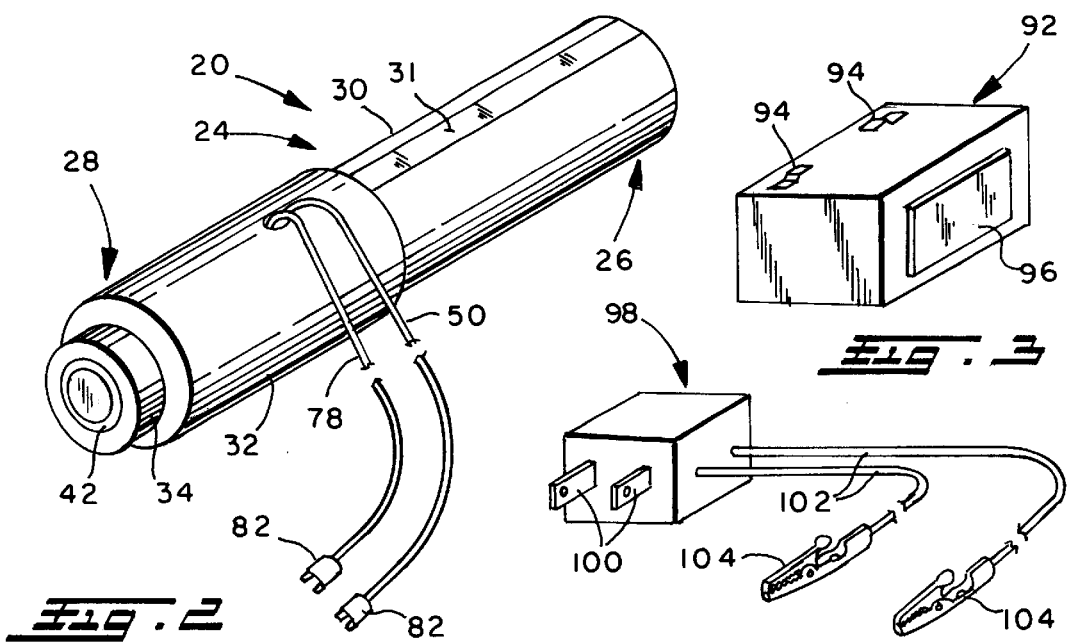

PART POSITIONER AND HOLDER FOR LATHES

BACKGROUND OF THE INVENTION

This invention relates to the art of metal working machines and, more particularly, to a device for positioning a workpiece and/or holding and stabilizing a portion of a workpiece relative to tooling used to machine the workpiece.

In connection with the machining of bar stock in a lathe, it is of course well known that a length of the bar stock is pushed or pulled through the tubular lathe spindle and chuck to a location spaced outwardly of the chuck at which the outer end of the bar stock is preliminary positioned relative to metal working tools by which the bar stock is to be machined. Such positioning of the bar stock may be relative to tooling on a cross slide displaced transversely of the spindle axis, tooling on a turret rotatable about an axis parallel to the spindle axis, or tooling supported laterally of the spindle axis on the bed or base of the lathe for displacement axially and/or transverse to the spindle axis. As is further well known, such tooling is operable for turning, boring, reaming, end facing, cut-off, and other machining operations. In connection with turrets and cross slides, it is common today to use computer numerically controlled machining techniques (CNC) to achieve, on a continuously repeatable basis, a predetermined sequence of machining operations on the outer end of bar stock rotatably supported on the lathe's chuck. Such computer controlled machining operations are extremely efficient with respect to time and extremely accurate with respect to the duplication of a part being machined.

Heretofore, the positioning of the outer end of bar stock relative to lathe tooling has been achieved by manually pulling the bar stock forwardly of the lathe chuck into abutting engagement with a stop on a cross slide or turret, or pushing the bar stock forwardly of the chuck through the use of a mechanical or hydraulic driving arrangement. As an alternative to such a hard stop, a mechanical or hydraulic bar feeder may advance the bar a predetermined distance to provide the initial position for the machining operations. Most often, end facing of the outer end of the bar stock is the initial machining operation and is necessary to assure accuracy with respect to the subsequent tooling operations and the dimensional accuracy of the part being produced. In addition to the time required for such a facing operation, the time required to initially position the bar stock forwardly of the lathe chuck varies depending on the bar feeder speed or the time to manually position the bar stock to a hard stop. In any event, positioning and end facing are steps which undesirably increase the overall time required to produce a given product. A further problem exists with respect to the fact that mechanical arrangements for gripping and advancing the bar stock relative to the lathe chuck often mar the outer surface of the bar stock and, accordingly, a mark or marks can be left on the outer surface of the final product if the machining operations on the bar stock do not remove a sufficient amount of metal from the outer surface.

Another problem encountered in connection with the machining of bar stock in a lathe occurs during cutting off of an outer end portion of the bar stock or the transverse cutting of the bar stock as the final step in the production of a part. The problem in end cutting occurs as the cut-off tool moves radially inwardly toward the axis of the bar stock and reaches a point at which the remaining metal about the bar stock axis cannot support the weight of the end portion being cut-off. At this point the end portion begins to sag and wobble relative to the bar stock axis which results in pinching of the cut-off tool. Such pinching action is potentially dangerous in that the free end of the workpiece can snap off prior to completion of the cut and become a projectile in the vicinity of the lathe. Furthermore, the pinching action can damage both the end face of the bar stock and the cut-off tool and, at a minimum, causes wearing and thus shortening of the life of the cut-off tool. Damage to the end face of the bar stock requires an end facing operation in connection with the machining of the next product from the bar stock. All of these problems undesirably increase the cost of production per part.

SUMMARY OF THE INVENTION

In accordance with the present invention, a device is provided for mounting on a metal working lathe which advantageously minimizes or overcomes the foregoing and other problems heretofore encountered in connection with initially positioning bar stock relative to tooling and/or in connection with a bar stock cut-off operation. More particularly in accordance with the invention, a magnetic device is mountable on a support component of a metal working lathe, such as a turret, cross slide or tail stock and, in connection with a machining operation, is adapted to be aligned with bar stock supported in the chuck of the lathe and operated for initially positioning the bar stock relative to the turret or cross slide and/or for stabilizing or holding the outer end of the bar stock against sagging or wobbling during a cut-off operation. Optimum accuracy with respect to the initial positioning of the bar stock is achieved by advancing the turret or cross slide with the magnetic device mounted thereon toward and into engagement with the bar stock and then withdrawing the turret or cross slide to the pre-set working position thereof in which the tools on the turret or cross slide are positioned to perform their respective machining operations in connection with the sequential displacement of the tools into working engagement with the bar stock. By advancing the turret or cross slide to engage the magnetic device with the outer end of the bar stock and then pulling the latter to the initial machining position therefor, facing of the bar stock is eliminated as an initial machining requirement whereby the facing process time per part is eliminated, and the positioning time is reduced relative to that required either by manually pulling the bar stock against a fixed stop or mechanically or hydraulically pushing the bar stock to a programmed stopping position. Still further, by magnetically engaging the outer end of the bar stock and pulling the latter through the lathe spindle, there is no marring of the outer surface of the bar stock of the character resulting from the mechanical gripping thereof in connection with positioning drives used heretofore. With regard to a cut-off operation, the outer end face of bar stock or of a product just machined can be engaged by the magnetic device to support and stabilize the product or free end of the bar stock during the cut-off operation. In this respect, the magnetic device exerts an axially outward pull on the end portion to preclude sagging or wobbling of the end portion as the cutting tool approaches the axis of the bar stock and, thus, pinching of the cut-off tool and the potential of the cut-off end piece becoming a projectile. Accordingly, with a magnetic positioning and holding device according to the invention, tool life is advantageously improved, damage to tooling and the end face of the bar stock and/or the opposed end face of a machined product is avoided, and the per part cost of products is advantageously reduced.

Preferably, the magnetic device includes an electromagnet which can be turned on in connection with the initial positioning of bar stock or the holding of the outer end thereof during a cut-off operation and which can be turned off at other times so as to avoid the accumulation of magnetic material thereon which could affect the accuracy of positioning and/or the power of the magnet. Still further, the electromagnet switch is preferably a pressure responsive switch associated with the cooling liquid circuit for the lathe so that the electromagnet is activated by the flow of coolant to the switch and deactivated when the coolant flow is shut off. Especially in connection with the automated flow and cut-off of coolant to each tool station of a lathe turret or cross slide, activation and deactivation of the magnetic device is totally automatic, thus optimizing efficiency with respect to the overall machining operation.

It is accordingly an outstanding object of the present invention to provide improvements in connection with devices for initially positioning bar stock in a metal working lathe and/or supporting an end portion of bar stock or a machined workpiece during a cut-off operation.

Another object is the provision of a magnetic device mountable on a metal working lathe for initially positioning bar stock relative to tooling for machining the bar stock and/or for supporting the free end of bar stock during a cut-off operation.

A further object is the provision of an improved positioning device for initially positioning bar stock in a metal working lathe relative to tooling for performing metal working operations on the bar stock.

Still another object is the provision of a positioning device of the foregoing character which is more efficient with respect to the time required to initially position bar stock relative to feeding and positioning arrangements heretofore available.

Yet another object is the provision of a positioning device of the foregoing character which provides savings in connection with the per part cost of products relative to such costs using previously available bar stock feeding and positioning arrangements.

Yet a further object is the provision of an electromagnetic positioning and support device of the foregoing character operable in conjunction with coolant flow in a lathe so as to activate the positioning and holding device only during periods of use thereof.

Still a further object is the provision of a bar stock positioning and holding device of the foregoing character which is structurally simple, economical to manufacture, and easy to install and operate.

BRIEF DESCRIPTION OF THE DRAWINGS

The foregoing objects, and others, will in part be obvious and in part pointed out more fully hereinafter in conjunction with the following written description of preferred embodiments of the invention illustrated in the accompanying drawings in which:

FIG. 1 is a perspective view of a portion of a turret lathe having a magnetic bar stock positioning and/or holding device in accordance with the present invention mounted on the turret;

FIG. 2 is a perspective view of the magnetic device shown in FIG. 1;

FIG. 3 is a perspective view of the battery shown in FIG. 1 for powering the magnetic device;

FIG. 4 is a perspective view of another embodiment of a power source for the magnetic device;

DESCRIPTION OF PREFERRED EMBODIMENTS

Figure 5:
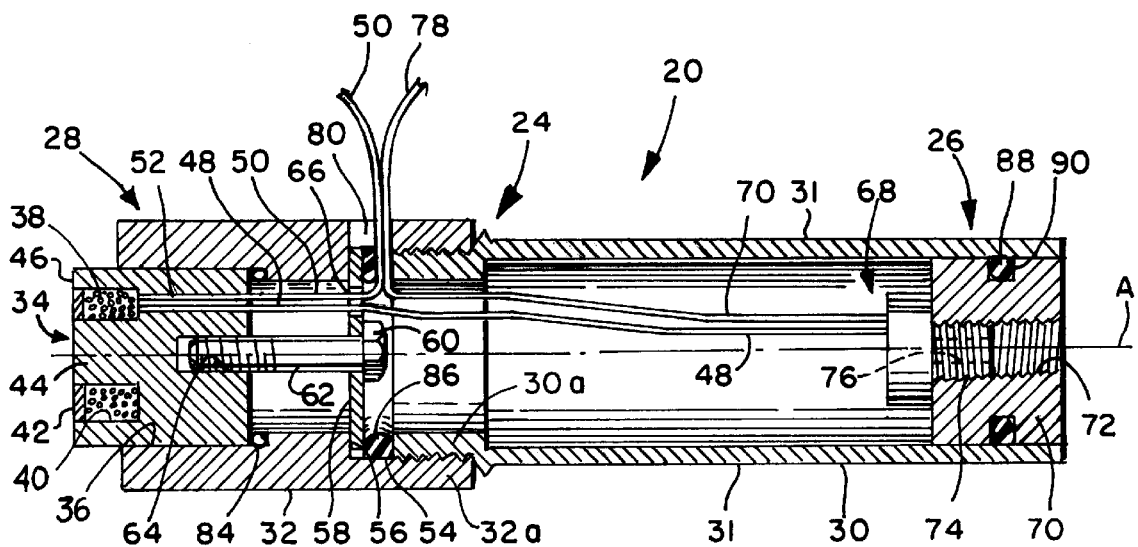
FIG. 5 is a sectional elevation view of the magnetic device shown in FIG. 2; and, FIG. 6 is a plan view somewhat schematically illustrating the magnetic positioning and/or holding device mounted in the tail stock of a metal working lathe.

Referring now in greater detail to the drawings, wherein the showings are for the purpose of illustrating preferred embodiments of the invention only and not for the purpose of limiting the invention. FIG. 1 illustrates a turret lathe 10 which can be a CNC lathe and which comprises a turret 12 mounted on a turret support head 14 for rotation about a turret axis, not shown, and which support head is mounted on the lathe bed 16 for axial displacement toward and away from the lathe chuck 18. In a well-known manner, a plurality of metal working tools T are mounted on turret 12 at tool mounting locations circumferentially spaced apart about the turret axis and, as is well known in connection with a CNC lathe, the tools are indexed sequentially to a workstation of the lathe in accordance with a computer program for each tool to perform a corresponding machining operation on a workpiece W supported for rotation relative to the tooling by chuck 18. In the embodiment of FIG. 1, a magnetic workpiece positioning and/or holding device 20, the structure of which will be described in detail hereinafter, is mounted on turret 12 at one of the tool mounting locations thereon through the use of a boring bar holder 22 and is operable in a manner described in greater detail hereinafter to initially position workpiece W at the workstation of the lathe for the performance of the machining operations thereon by tooling T.

Referring now to FIGS. 2 and 5 in conjunction with FIG. 1, device 20 comprises a housing 24 having an axis A and axially opposite mounting and operating ends 26 and 28, respectively. Housing 24 comprises tubular housing members 30 and 32 respectively providing mounting end 26 and operating end 28, and the housing members have axially inner ends 30a and 32a which are respectively externally and internally threaded for interengagement to provide housing 24. Housing member 30 has diametrically opposed flats 31 extending axially therealong from inner end 30a to the axially outer end of the housing member for mounting device 20 on boring bar holder 22. Device 20 further includes a magnet member which, in the preferred embodiment, is an electromagnet 34 received in a bore 36 in the axially outer end of housing member 32 and having a wire coil 38 received in an axially outwardly open recess 40 in the magnet member and in which the coil is encapsulated in an epoxy 42. Recess 40 is coaxial with axis A and provides a magnetic core having inner and outer core portions 44 and 46, respectively. Wire coil 38 has conductor ends 48 and 50 extending rearwardly through a bore 52 provided therefor in magnet member 34 and, while not shown for purposes of clarity, bore 52 is preferably filled so as to encapsulate the portions of the conductor ends therein in an epoxy. The interior of inner end 32a of housing member 32 includes a circumferential recess 54 and a radially extending shoulder 56 axially inwardly of the internal threads on the housing member, and electromagnetic member 34 is retained in bore 36 by a washer 58 engaging against shoulder 56 and a retaining bolt having a head 60 engaging against the axially inner side of washer 58 and a threaded shank 62 threadedly interengaged with a threaded bore 64 in the axially inner end of magnet member 34. Washer 58 has an opening 66 therethrough laterally outwardly of bolt head 60 and through which conductor ends 48 and 50 extend for connection to a power source through a control switch which, in the preferred embodiment, is a fluid pressure responsive switch 68 mounted inside housing member 30 adjacent the axially outer end thereof. More particularly in this respect, switch 68 can, for example, be a fluid pressure responsive transducer supported in housing member 30 by a plug member 70 which is press fitted therein and which has an internally threaded bore 72 therethrough receiving the externally threaded stem 74 of the transducer housing which sealingly engages against the inner face of plug 70. Stem 74 includes a bore 76 in fluid flow communication with bore 72 in plug 70, whereby fluid under pressure entering bore 72 is operable to activate switch 68 from an open to a closed position thereof for the purpose set forth hereinafter. Coil 38 of electromagnet member 34, switch 68 and a power supply to be described hereinafter are connected in series in an electrical circuit for switch 68 to control the energization and deenergization of the electromagnet and, partially in this respect, switch 68 is interposed in a line of the electrical circuit defined by coil end conductor 48 and a conductor 78. Coil end conductor 50 and conductor 78 extend outwardly of housing 24 through an opening 80 in housing member 32 and, as will be appreciated from FIG. 2, conductors 50 and 78 have outer ends, each of which is provided with a connector clip 82. Conductor ends 48 and 50 and conductor 78 may be enclosed in a protective sheathing, not illustrated, and the interior of housing 24 is preferably sealed against the ingress of coolant or other machining liquids by an O-ring 84 between the axially inner ends of magnet member 34 and bore 36, an O-ring 86 between washer 58 and the axially inner end face of end 30a of housing member 30, and an O-ring 88 in a radially outwardly open recess 90 extending circumferentially about the outer surface of plug 70.

In the embodiment illustrated in FIG. 1, the power supply for the electrical circuit including electromagnet coil 38 is a 24-volt battery 92 which, as best seen in FIG. 3, is provided with a pair of terminals 94 adapted to receive connector clips 82 so as to connect the battery end series with coil 38 through switch 68. Further in connection with the embodiment shown in FIG. 1, and again as best seen in FIG. 3, battery 92 is provided with a magnet pad 96 by which the battery can be removably mounted on the inner side of turret 12 or any other support surface of magnetic material to which the magnet pad will adhere. As an alternative to battery 92, and as shown in FIG. 4, the power supply can be an adapter or transformer 98 which, in a well-known manner, is adapted to be connected to a source of 120 volt AC power by contacts 100 and to output 24 volt DC power through conductors 102. The outer ends of conductors 102 can be provided with alligator clips 104 for connection with connector clips 82 of magnetic device 20 or, alternatively, could be provided with planar terminals for connection with clips 82.

As schematically illustrated in FIG. 1, lathe 10 includes a coolant reservoir 106 from which coolant is pumped through a line 108 by a pump 110 to the tool mounting locations on turret 12, and the coolant circuit includes a return line 112 by which coolant is returned to reservoir 106. As mentioned hereinabove, magnetic device 20 in the embodiment disclosed is mounted on turret 12 through the use of boring bar holder 22 which is directly mounted on the turret. When so mounted, coolant is delivered to the interior of holder 22 and thus is in flow communication with bore 72 in plug 70 of magnetic device 20. As is well known, coolant flow in some lathes occurs in response to movement of a given tool mounting location to the working position for the corresponding tool relative to the workpiece being machined. In other lathes, a hose or other fluid line may be connected to the interior of the tool mount at each of the tool mounting locations on the turret and the flow through each line controlled so as to take place when the corresponding tool is at the workstation. In any event, it will be appreciated that the foregoing and other coolant flow arrangements provide for the selective flow of coolant to the tool or tool holding component at each of the tool mounting stations so that there is a flow of coolant onto the tool and workpiece during the machining operation performed by each tool. With further regard to FIG. 1, magnetic positioning device 20 is removably mounted on boring bar holder 22 by set screws 114 which engage flats 31 on housing member 30 of the device. When the component parts are in the positions shown in FIG. 1, the turret 12 has been axially advanced towards workpiece W so as to position the axially outer end of magnetic device 20 close to or in abutting relationship with the axially outer end of workpiece W. The latter may be, for example, bar stock measuring several feet in length and which is adapted to be displaced axially forwardly of chuck 18 to a working position in which the sequential machining operations are to take place. More particularly in this respect, chuck 18 is opened so that workpiece W can be moved axially relative thereto, the flow of coolant against pressure responsive switch 68 closes the circuit to power supply 92, whereby coil 38 is energized and the electromagnet attracts workpiece W thereagainst. Turret 12 is then retracted to the working station position thereof, and the mounting of magnetic device 20 relative to the turret provides an accuracy of positioning of workpiece W at the workstation which corresponds to the accuracy of the computer controlled axial positioning of turret 12 at the workstation. When the workpiece is so positioned, chuck 18 is closed and the flow of coolant to the pressure responsive switch 68 is terminated whereby coil 38 is deenergized and the turret can be indexed to achieve the sequential machining operations on the workpiece. While the magnetic positioning and holding device 20 illustrated in FIGS. 1, 2 and 5 is designed for mounting on a lathe turret through the use of a boring bar holder, it will be appreciated that other arrangements can be devised for mounting the positioning device on a turret and that the mounting end of the positioning device can be modified to provide or to accommodate the components of other mounting arrangements.

Figure 6:
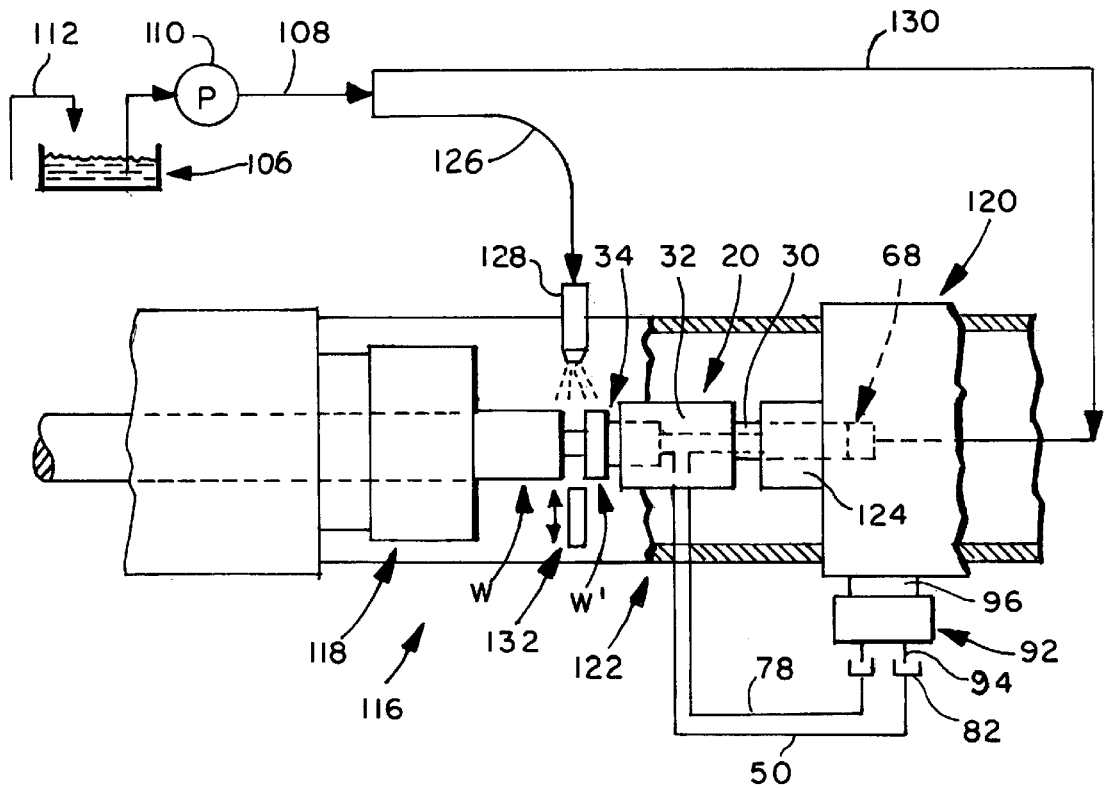

FIG. 6 somewhat schematically illustrates a lathe in which the magnetic positioning and holding device described hereinabove is mounted on the tail stock of the lathe to provide a holding function with respect to the outermost end of a workpiece during a cut-off operation. More particularly in this respect, lathe 116 comprises a chuck 118 for rotatably supporting workpiece W, and a tail stock unit 120 is supported on lathe bed 122 for sliding movement toward and away from chuck 118. Tail stock 120 is provided with a collet 124 or other support arrangement for mounting magnetic device 20 on the tail stock coaxial with chuck 118 and for movement with the tail stock along the lathe bed. The coolant circuit for the lathe includes a line 126 and nozzle 128 for directing coolant onto workpiece W during the cut-off operation, and a line 130 is provided having an end coupled with threaded bore 72 in magnetic device 20 for actuating switch 68 in the manner described hereinabove. In connection with a cut-off operation, the cutting tool 132 is shown radially outwardly of the workpiece for purposes of clarity and it will be appreciated that during the cut-off operation the tool would be in cutting engagement with the workpiece and thus, in FIG. 6, in cutting engagement with the stem connecting the outermost end portion W' with the remainder of the workpiece. Heretofore, as the cutter approaches the axis of the workpiece, the weight of end portion W' causes the latter to sag and wobble, thereby axially pinching the cutter as the cut-off operation is completed. By using magnetic positioning and holding device 20 in the manner shown in FIG. 6, end portion W' of the workpiece is pulled axially outwardly and thus is stabilized against such wobbling, whereby the cut-off operation is clean and free of the pinching action on the cut-off tool. More particularly in this respect, electromagnetic member 34 engages the outer end face of end portion W' of the workpiece which rotates relative to the magnet member thus holding or stabilizing end portion W' so that it remains transverse to the workpiece axis. In connection with the description hereinabove, it will be appreciated that the coil of electromagnetic member 34 is energized when coolant flows onto the workpiece and thus remains energized during the cut-off operation.

While considerable emphasis has been placed herein on the structures and structural interrelationships between the component parts of preferred embodiments of the invention, it will be appreciated that other embodiments can be devised and that many changes can be made in the preferred embodiments without departing from the principles of the invention. In particular in this respect, it will be appreciated that coolant can be directly connected to threaded passage 72 of the magnetic device through a hose and coupling arrangement and that the control of coolant to the magnetic positioning and holding device can be manually controlled such as through a valve so as to activate and deactivate the coil of the electromagnet. Likewise, it will be appreciated that connection of the electromagnet coil to a power supply can be through a manually controlled switch as opposed to the preferred coolant responsive switch. These and other modifications of the preferred embodiments will be suggested and obvious to those skilled in the art from the preferred embodiments disclosed herein. Accordingly, it is to be distinctly understood that the foregoing descriptive matter is to be interpreted merely as illustrative of the invention and not as a limitation.

Having thus described the invention, it is so claimed:

1. A magnetic device for use with a metal working lathe having a chuck rotatable about a chuck axis for rotatably supporting a workpiece to be machined and support means movable axially toward and away from said chuck, said device comprising a housing having axially opposite ends, one of said ends being a mounting end for attachment to said support means for movement of the magnetic device therewith toward and away from a workpiece supported in the chuck, electromagnet means in said housing adjacent the other of said opposite ends, an electric circuit for connecting said electromagnet means to a power source, and said circuit including switch means for selectively opening and closing said circuit.

2. The device according to claim 1, wherein said switch means is in said housing.

3. The device according to claim 1, wherein said switch means includes a fluid pressure responsive switch.

4. The device according to claim 1, wherein said s a coolant circuit having means for flowing a coolant under pressure, and said switch means closes said electric circuit when coolant is flowing in said coolant circuit.

5. The device according to claim 1, wherein said switch means includes a fluid pressure responsive switch in said housing and said lathe includes a coolant circuit having means for flowing a fluid coolant under pressure, and means on said housing for flowing coolant to said housing for actuating said switch means to close said electric circuit when coolant is flowing in said coolant circuit.

6. The device according to claim 5, wherein said switch means is adjacent said mounting end of said housing and said mounting end includes an inlet passageway for the flow of coolant to said switch means.

7. The device according to claim 1, wherein said power source is 24 volts d.c.

8. The device according to claim 7, wherein said 24 volt power source is a battery.

9. The device according to claim 8, wherein said battery includes a base of magnetic material for removably holding said battery on a support surface of magnetic material.

10. The device according to claim 7, wherein said 24 volt power source is an adapter having a 24 volt d.c. output and an input for connection to a source of 120 volt a.c. power.

11. The device according to claim 1, wherein said switch means includes a fluid pressure responsive switch and said power source is 24 volts d.c.

12. The device according to claim 11, wherein said switch means includes a fluid pressure responsive switch in said housing and said lathe includes a coolant circuit having means for flowing a coolant under pressure, and means on said housing for flowing coolant to said housing for actuating said switch means to close said electric circuit when coolant is flowing in said coolant circuit.

13. The device according to claim 12, wherein said 24 volt power source is a battery.

14. The device according to claim 12, wherein said 24 volt power source is an adapter having a 24 volt d.c. output and an input for connection to a source of 120 volt a.c. power.

15. The device according to claim 13, wherein said 24 volt power source is a battery, means for supporting said battery on said support means, and conductor means connecting said battery in said electric circuit.

16. The device according to claim 13, wherein said 24 volt power source is an adapter having a 24 volt d.c. output and an input for connection to a source of 120 volt a.c. power, and conductor means connecting said 24 volt d.c. output in said electric circuit.

\* \* \* \* \*